United States Patent [19]

Igoe

[11] 4,046,925
[45] Sept. 6, 1977

[54] ACIDIFIED MILK PRODUCT AND METHOD OF PRODUCING THE SAME

[75] Inventor: Robert S. Igoe, San Diego, Calif.

[73] Assignee: Merck & Co., Inc., Rahway, N.J.

[21] Appl. No.: 682,292

[22] Filed: May 3, 1976

Related U.S. Application Data

[63] Continuation-in-part of Ser. No. 577,145, May 13, 1975, abandoned.

[51] Int. Cl.$^2$ .............................................. A23L 1/04
[52] U.S. Cl. .................................. 426/573; 426/580; 426/586; 426/599
[58] Field of Search ............. 426/334, 573, 580, 586, 426/599, 654

[56] References Cited

U.S. PATENT DOCUMENTS

| | | |
|---|---|---|
| 2,853,386 | 9/1958 | Hughes .............................. 426/573 |
| 3,507,664 | 4/1970 | Schuppner .......................... 426/573 |
| 3,539,363 | 11/1970 | Morgan et al. ..................... 426/334 |
| 3,692,532 | 9/1972 | Shenkenberg et al. ............. 426/599 |
| 3,917,852 | 11/1975 | Maraulja et al. .................... 426/599 |

*Primary Examiner*—Raymond N. Jones
*Assistant Examiner*—C. A. Fan
*Attorney, Agent, or Firm*—Donald J. Perrella; J. Jerome Behan

[57] ABSTRACT

A method and composition are provided for preparing a novel acidified milk gel product, characterized by smooth body with no graininess and good flavor. The composition comprises a novel thickener system which is a blend of carboxymethyl cellulose, xanthan gum, and locust bean gum. The thickener is used as a level of from about 0.6-1.6 by weight based on the weight of the final total weight of the milk - acid system. The three components of the thickener composition are present at levels of from about 30% to about 50% for carboxymethyl cellulose, from about 20% to about 50% for xanthan gum, and from about 10% to about 45% for locust bean gum, all percentages as a percent of total weight of the thickener composition. The thickener system can be used for both hot and cold preparations.

16 Claims, No Drawings

ACIDIFIED MILK PRODUCT AND METHOD OF PRODUCING THE SAME

RELATED APPLICATION

This application is a continuation-in-part of copending application, United States Serial No. 577,145 filed May 13, 1975 now abandoned.

BACKGROUND OF THE INVENTION

It has long been desired to successfully prepare a food product in which milk and acid juices, especially fruit juices were blended to provide valuable nutritional advantages. There are inherent difficulties, however, in combining milk, which has a tendency to curdle, with fruit juice having a relatively high acid content. Products which have been produced lack palatability, in many cases have lost essential vitamins, or are devoid of "lasting" qualities so that they deteriorate rapidly.

OBJECTS OF THE INVENTION

Accordingly, it is a major purpose of the present invention to produce a novel mild and acid fruit juice beverage or desert without necessity for chemical neutralizers which will be highly palatable, have a high protein content, a smooth and creamy consistency, have a tender body, a firm moldable texture, and a relatively long life with deterioration.

It is another object to produce a novel milk and acid fruit juice beverage or dessert using low fat milk. Low fat milk is generally accepted in the industry to be below 2% fat content.

It is a further object of this invention to provide a particularly pleasing and nutritious dessert per se. It is a still further object to provide a novel milk and fruit juice product which may be packaged and distributed through ordinary channels and with a minimum of refrigeration, together with the normal commercial distribution and sale of fresh milk or fruit juices.

In addition, other acid food juices, in addition to fruit juices, can be used to prepare flavored milk desserts.

Other objects will become apparent upon further reading.

SUMMARY OF THE INVENTION

This invention provides for the combination of milk and acid juices in a palatable, high protein beverage or food product which will remain stable. The fruit juice will remain within the product, as a finely divided widely dispersed mixture, providing uniformity of flavor without noticeable particles or any graininess.

To accomplish this result, this invention provides a novel thickener system which results in the desirable product. This thickener system is a blend of carboxymethyl cellulose, locust bean gum, and xanthan gum. The amounts of each component is as follows (percents based on weight of the total thickener composition and the total is 100%):

carboxymethyl cellulose from about 30% to about 50%
locust bean gum from about 10% to about 45%
xanthan gum from about 20% to about 50%

Within the above broad ranges, I have found certain ideal levels for specific formulations, depending on whether the final product is processed using cold or hot temperatures. The optimum composition for cold processing usage contains from about 20% to about 35% xanthan gum, from about 20% to about 45% locust bean gum, and from about 30% to about 50% carboxymethyl cellulose (total is 100%). For hot processing, from about 35% to about 50% xanthan gum, from about 15% to about 20% locust bean gum, and from about 30% to about 50% carboxymethyl cellulose is used (total is 100%).

The chosen amount of each component can be dry mixed together, with sugar if desired, and added to the milk, followed by addition of the fruit juice. Alternatively, the thickeners can be added separately, first adding carboxymethyl cellulose to the milk, followed by addition of the fruit juice and the locust bean gum and and xanthan gum. The final blend can be heated, or not, as desired during preparation. Slight changes of the amounts of the individual thickener components can be made, depending on whether cold or hot processing is chosen, as illustrated in the examples which are set forth in more detail below.

The thickener composition, as defined above, is used in the final milk-fruit juice product in an amount of from about 0.65% and about 1%, when the mixture is prepared hot, or from about 0.85% to about 1.6%, when the mixture is prepared cold, based on weight of the final volume amount. The final liquid volume is the volume total of the milk and the fruit juice. Generally, the milk-fruit juice is used in approximately equal amounts by volume of each.

It is noted that the use of carboxymethyl cellulose as a protein stabilizer has been taught in the literature, see C.A., 56, 1816b; C.A., 78, 83016u. In addition, carboxymethyl cellulose has been used in a milk-fruit juice beverage, see Shenkenberg et al., *Food Engineering*, 43, No. 4, Apr. 1971. I have found that carboxymethyl cellulose alone in a milk-fruit juice blend, at a level below 0.35%, did not form a gel, but a liquid product.

Also taught in the literature is the use of xanthan gum and locust bean gum to thicken acidified milk products, see U.S. Pat. No. 3,726,690. In this case, as in the literature above, the milk products have a high fat content, see the Examples of that Patent. When I experimented using low fat content milk-fruit juice blends thickened with xanthan gum-locust bean gum alone, I observed a graininess of texture which is highly undesirable.

It is therefore apparent that the focus of this invention is the discovery that milk-fruit juice blends can be prepared having superior characteristics using the synergistic effects of a mixture of carboxymethyl cellulose and xanthan gum-locust bean gum. I also found that the pH of the final products could be reduced substantially lower, to from about 3 to about 4.5, than those products prepared in the prior art, with a resultant improved flavor, even with the low fat levels present. My thickener composition is useful down to a pH range of from about 3 to about 4.5.

Suitable fruit juices are orange, Hawaiian Punch, black cherry, cranapple, papaya, mango, grape, cranberry, lemon-lime, grapefruit, but this list is nonlimiting, and many suitable fruits and juices will occur to those skilled in the art.

This invention is further illustrated by the following examples:

EXAMPLE 1

Gel Made by One-Step "Hot" Process

The final level of the components of the system are as follows:

| Ingredients | Percent by Weight |
|---|---|
| Xanthan gum | 0.35 |
| Locust bean gum | 0.14 |
| Carboxymethyl cellulose | 0.30 |
| Total thickener content | 0.79 |
| Milk | 45.00 |
| Juice (Hawaiian Punch, reconstituted frozen 2:1) | 45.00 |
| Sugar | 9.01 |
| Citric acid | .20 |
| Total fat content of system | 1.58% |

A blend of xanthan gum, locust bean gum, and carboxylmethyl cellulose is dry mixed, then blended with the sugar. This blend is added to milk at room temperature and mixed for about 1-2 minutes. The fruit juice, to which is added the citric acid, is then added to the milk mixture and blended with stirring. The final pH is 3.9. While stirring is continued, the mixture is heated to 160° F. for 30 minutes. The hot mixture is then packaged, by pouring into decorative trays or another suitable container in the desired serving quantity. The mixture is then cooled to below 40° C., and is ready for consumption or shipping.

EXAMPLE 2

Gel Made by Two-Step "Hot" Process

The following formulations were prepared using the process herein described:

| Ingredients | Percent by Weight | | |
|---|---|---|---|
| Flavor | Hawaiian Punch | Black Cherry | Orange |
| Xanthan gum | 0.37 | 0.37 | 0.37 |
| Locust bean gum | 0.15 | 0.15 | 0.15 |
| Milk | 45.00 | 45.00 | 45.00 |
| Juice (reconstituted frozen concentrate 2 × 1) | 45.00 | 45.00 | 45.00 |
| Sugar | 8.98 | 8.98 | 8.88 |
| Carboxymethyl cellulose | 0.30 | 0.30 | 0.30 |
| Citric acid | 0.20 | 0.20 | 0.30 |
| TOTAL | 100.00 | 100.00 | 100.00 |

| Ingredients | Percent by Weight | | |
|---|---|---|---|
| | Hawaiian Punch | Black Cherry | Orange |
| (total thickener content) | 0.82 | 0.82 | 0.82 |
| Total fat content of system: | 1.58%; | 1.58%; | 1.58%. |

The carboxymethyl cellulose blended with half the sugar, is added to milk while stirring, and stirring is continued for 15 minutes. The fruit juice (frozen reconstituted 2 × 1, and acidified with citric acid, is then added to the milk and mixed. The xanthan gum, and locust bean gum blended with the rest of the sugar, is then added to the liquids while stirring. Final pH is 4.1. Under continuous stirring, the mixture is heated to 160° F. for 30 minutes. The mixture is then packaged cooled to below 40° C. and consumed, or shipped.

EXAMPLE 3

The orange flavor formulation in Example 2 was modified to prepare a orange juice flavored gel using a "cold" process. The same general procedure was followed, except that no heat was applied while stirring, and stirring was continued at low speed after all ingredients were added, for seven minutes.

| Ingredients | Percentage |
|---|---|
| Xanthan gum | 0.24 |
| Locust bean gum | 0.40 |
| Carboxymethyl cellulose | 0.30 |
| Milk | 45.00 |
| Orange juice (reconstituted frozen 2 × 1) | 45.00 |
| Sugar | 8.86 |
| Citric Acid | 0.20 |
| TOTAL | 100.00 |

EXAMPLE 4

Showing Synergistic Effect of the Thickener Blend Components

A gel made by the one-step "hot" process, Example 1 above, was compared with two mixes made using identical food ingredients, but with either carboxymethyl cellulose above or the xanthan gum — locust bean gum blend as thickener.

| Thickener | Percent Thickener | Fat Level | Quality of Texture |
|---|---|---|---|
| Example 1 blend | .79 | 1.58 | Excellent, smooth, tender gel |
| Carboxymethyl cellulose | .3 | 1.58 | Smooth viscous non-gelled liquid |
| Xanthan gum/ locust bean gum | .35/ .14 | 1.58 | Non-gelling, grainy |

EXAMPLE 5

Following the procedure of Example 1, the following formulations are prepared into a juice-flavored gel using a "hot" process and a gum blend consisting of 39.4% xanthan gum, 15.2% locust bean gum and 45.4% carboxymethyl cellulose.

| I. FORMULATION: | % | |
|---|---|---|
| | (A) | (B) |
| KELTROL F | .26 | .26 |
| Locust Bean Gum | .10 | .10 |
| Carboxymethyl cellulose | .30 | .30 |
| Sugar | 9.09 | 9.09 |
| Citric Acid, anhydrous | .25 | .25 |
| Juice (Hawaiian Punch reconstituted) | 45.00 | 45.00 |
| (A) Half & Half Cream (11.3% Fat) | 45.00 | — |
| (B) Cream Mix (7.25% Fat) | — | 45.00 |
| Final Gel Fat Level (A) 5.6% Fat (B) 3.6% Fat | | |

The acid gels from formulations A and B each had a smooth body exhibiting no graininess indicative of protein precipitation. The gels had a richer taste than those using low fat due to the increase of fat content.

Similar results are obtained using either of the above formulations with the procedure of Example 2.

What is claimed is:

1. A gel-forming composition for use in a blend comprising fruit juice and milk or fruit juice and cream, the blend having a pH below about 4.5, said gel forming composition comprising from about 20% to about 50% xanthan gum, from about 10% to about 45% locust bean gum, and from about 30% to about 50% carboxymethyl cellulose, the percentages being based on the total weight of the gel-forming composition and chosen so that the total is 100%.

2. The composition of claim 1 which has the following components:
   xanthan gum . . . . from about 35% to about 50%
   locust bean gum . . . . from about 15% to about 20%
   carboxymethyl cellulose . . from about 30% to about 50%

3. The composition of claim 2 which has the following components:
   xanthan gum . . . . about 45%
   locust bean gum . . . . about 18%
   carboxymethyl cellulose . . . . about 37%

4. The composition of claim 1 which has the following components:
   xanthan gum . . . . from about 20% to about 35%
   locust bean gum . . . . from about 20% to about 45%
   carboxymethyl cellulose . . . . from about 30% to about 50%

5. The composition of claim 4 which has the following composition:
   xanthan gum . . . . about 26%
   locust bean gum . . . . about 42%
   carboxymethyl cellulose . . . . about 32%

6. A process for making edible gelled food composition comprising milk and fruit juice or cream and fruit juice, the gelled composition having a pH below about 4 which comprises adding to the milk or cream at ambient temperature between about 0.6 and about 1% by weight based on final weight of the food product of a gel-forming composition comprising from about 20% to about 50% xanthan gum, from about 15% to about 45% locust bean gum, and from about 30% to about 40% carboxymethyl cellulose and then adding about the same weight of fruit juice as the milk or cream.

7. An edible gelled food composition comprising milk and fruit juice or cream and fruit juice thickened with from about 0.6 to about 1.6% of a thickener composition, the latter comprising from about 20% to about 50% xanthan gum, from about 15% to about 45% locust bean gum, and from about 30% to about 40% carboxymethyl cellulose, the gelled composition having a pH below about 4.5.

8. A process according to claim 6 wherein the final mixture is heated to from about 150° F to about 170° F. for from about 30 to about 60 minutes.

9. A composition according to claim 1 having a fat content below about 2%.

10. A composition according to claim 2 having a fat content below about 2%.

11. A composition according to claim 3 having a fat content below about 2%.

12. A composition acording to claim 4 having a fat content below about 2%.

13. A composition according to claim 5 having a fat content below about 2%.

14. A composition according to claim 7 having a fat content below about 2%.

15. A process according to claim 6 wherein the product has a fat content below about 2%.

16. A process according to claim 8 wherein the product has a fat content below about 2%.

* * * * *